(No Model.)
I. KITSEE.
VOLTAIC BATTERY.
No. 400,227. Patented Mar. 26, 1889.
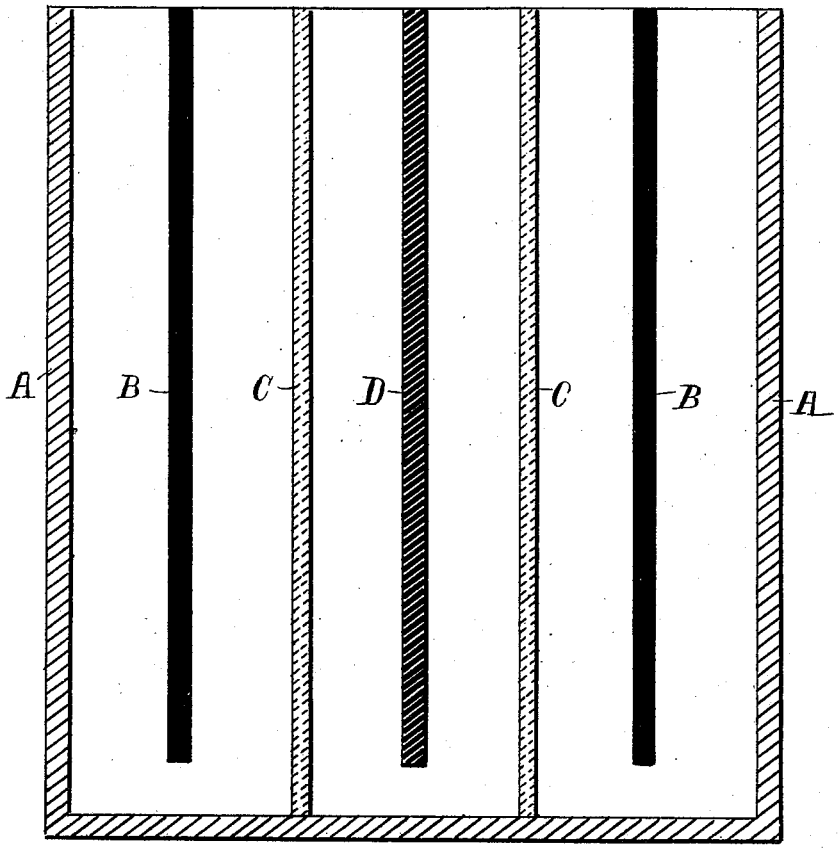
WITNESSES
F. Norman Dixon
Lewis Altmaier
Inventor:—
Isidor Kitsee
By his Attorneys,
Wm. C. Strawbridge
J. Bonsall Taylor

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

VOLTAIC BATTERY.

SPECIFICATION forming part of Letters Patent No. 400,227, dated March 26, 1889.

Application filed July 27, 1888. Serial No. 281,213. (No model.)

*To all whom it may concern:*

Be it known that I, ISIDOR KITSEE, a citizen of the United States, residing at Cincinnati, in the State of Ohio, have invented an Improvement in Voltaic Batteries, of which the following is a specification.

The object of my invention is the provision of a battery by which a continuous current of electricity may be produced by the employment of electrodes and battery fluids formed of materials easily obtained and of minimum cost. In the battery employed by me the positive electrode is iron and the negative electrode carbon.

In the drawing is represented, in vertical section, a voltaic battery in which A is the containing box or vessel, B the carbon or negative electrode, C porous partitions, and D the iron or positive electrode, said electrodes being so arranged within the containing box as to permit the battery fluid to circulate from one side to the other thereof.

The solution in which the positive or iron electrode is contained consists of a saturated solution of chlorate of sodium, to which may be added, in case it is desired to remove iron rust from the positive plate, hydro-chloric acid in quantity equal to about one-tenth to one-fifth of the weight of the entire solution contained in the compartment in which the positive electrode is placed. The carbon or negative element is immersed in sulphuric acid, or if polarization of the negative element is to be guarded against, a battery fluid is employed consisting of sulphuric and nitric acids, said acids being advantageously combined together in the proportion, by weight, of one part of nitric acid to three parts of commercial oil vitriol, to which may be added, by weight, six parts of water. I do not confine myself to the exact proportions named.

Other acids than sulphuric acid or sulphuric and nitric acids, may be used in the battery fluid in which the negative electrode is immersed without departing from my invention. I have made mention of sulphuric and nitric acids for the reason that they are cheap and easily obtained.

Having thus described my invention, I claim:—

1. In a voltaic battery cell, in combination, an iron electrode immersed in a battery fluid containing chlorate of sodium, or a chlorate of other material, and a carbon electrode immersed in a battery fluid containing sulphuric acid, as specified.

2. In a voltaic battery cell, in combination, an iron electrode immersed in a battery fluid containing chlorate of sodium, or a chlorate of other material, and a carbon electrode immersed in a battery fluid containing sulphuric and nitric acids, as specified.

3. In a voltaic battery cell, in combination, an iron electrode immersed in a battery fluid containing chlorate of sodium and hydro-chloric acid, and a carbon electrode immersed in a battery fluid containing sulphuric acid, as specified.

4. In a voltaic battery cell, in combination, an iron electrode immersed in a battery fluid containing chlorate of sodium and hydro-chloric acid, and a carbon electrode immersed in a battery fluid containing sulphuric and nitric acids, as specified.

5. In a voltaic battery, in combination, an iron electrode immersed in a battery fluid containing chlorate of sodium, or a chlorate of other material, and a carbon electrode immersed in a battery fluid containing acid, as specified.

In testimony that I claim the foregoing as my invention I have hereunto signed my name this 13th day of July, A. D. 1888.

ISIDOR KITSEE.

In presence of—
F. NORMAN DIXON,
LEWIS ALTMAIER.